(12) United States Patent
Gartner et al.

(10) Patent No.: US 7,753,600 B2
(45) Date of Patent: Jul. 13, 2010

(54) CAMERA ADAPTER HAVING A CAMERA HOLDER AND AN OPTICAL ADAPTER

(75) Inventors: Hartmut Gartner, Oberkochen (DE); Werner Koch, Keltern (DE); Wolfgang Robra, Wildbad (DE); Christian Lucke, Oberkochen (DE); Karsten Rieth, Dobel (DE)

(73) Assignee: Carl Zeiss Surgical GmbH (DE)

( * ) Notice: Subject to any disclaimer, the term of this patent is extended or adjusted under 35 U.S.C. 154(b) by 305 days.

(21) Appl. No.: 11/999,342

(22) Filed: Dec. 5, 2007

(65) Prior Publication Data

US 2008/0152337 A1 Jun. 26, 2008

(30) Foreign Application Priority Data

Dec. 5, 2006 (DE) .................. 10 2006 058 358

(51) Int. Cl.
*G03B 17/00* (2006.01)
(52) U.S. Cl. ...................... 396/428; 396/419
(58) Field of Classification Search ............. 396/17, 396/419, 420, 424, 425, 428, 429, 432
See application file for complete search history.

(56) References Cited

U.S. PATENT DOCUMENTS

| 2,990,759 | A | | 7/1961 | Marcosky ............ 396/324 |
| 4,279,486 | A | * | 7/1981 | Ogawa ............... 396/17 |
| 4,728,974 | A | * | 3/1988 | Nio et al. ............ 348/359 |
| 5,162,829 | A | * | 11/1992 | Lynch et al. ......... 396/429 |
| 5,264,928 | A | * | 11/1993 | Howes ............... 348/79 |
| 5,731,910 | A | | 3/1998 | Baumann ............ 359/689 |
| 6,357,937 | B1 | * | 3/2002 | Stratton, Jr. ......... 396/428 |
| 6,591,069 | B2 | * | 7/2003 | Horiguchi ........... 396/429 |
| 6,628,458 | B1 | | 9/2003 | Brock |
| 7,085,491 | B2 | * | 8/2006 | Chiang .............. 396/432 |
| 2001/0048549 | A1 | | 12/2001 | Wang ................ 359/363 |
| 2002/0197075 | A1 | * | 12/2002 | Crockett ............. 396/429 |
| 2005/0036782 | A1 | | 2/2005 | Claudi et al. ........ 396/328 |
| 2005/0078956 | A1 | * | 4/2005 | Pernstich et al. ..... 396/428 |

FOREIGN PATENT DOCUMENTS

| CH | 89828 | 6/1921 |
| CH | 313185 | 5/1956 |
| DE | 297 22 332 | 4/1998 |
| DE | 20010421 U1 | 9/2000 |
| GB | 1 215 710 | 12/1970 |
| JP | 2002-277953 | 9/2002 |
| JP | 2002-350740 | 12/2002 |
| JP | 2006-039191 | 2/2006 |
| WO | WO 90/12335 | 10/1990 |

\* cited by examiner

*Primary Examiner*—W.B. Perkey
*Assistant Examiner*—Warren K Fenwick
(74) *Attorney, Agent, or Firm*—Gerald E. Hespos; Michael J. Porco

(57) ABSTRACT

A camera holder (3) is provided for fixing a camera (11) or a camcorder to an optical observation device. The holder (3) has a variable-length sleeve (13) with a first end configured to receive the camera objective and a second end configured to secure the sleeve (13) relative to the optical observation device. The holder (3) also has an adjusting device (19) fixed to the sleeve (13). The adjusting device (19) has a pin for connection with a stand mating thread of a camera (11) and is configured to compensate for an offset between the stand mating thread and the camera objective. The adjusting device (19) enables the camera (11) to be positioned with respect to the sleeve and the optical observation device.

13 Claims, 6 Drawing Sheets

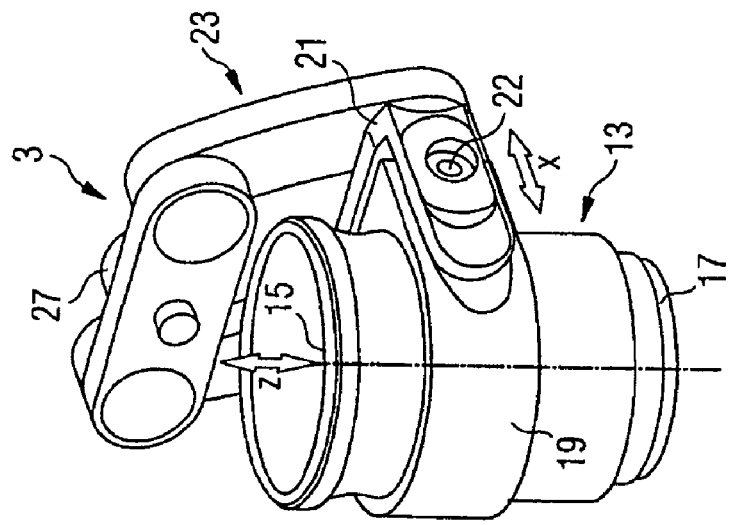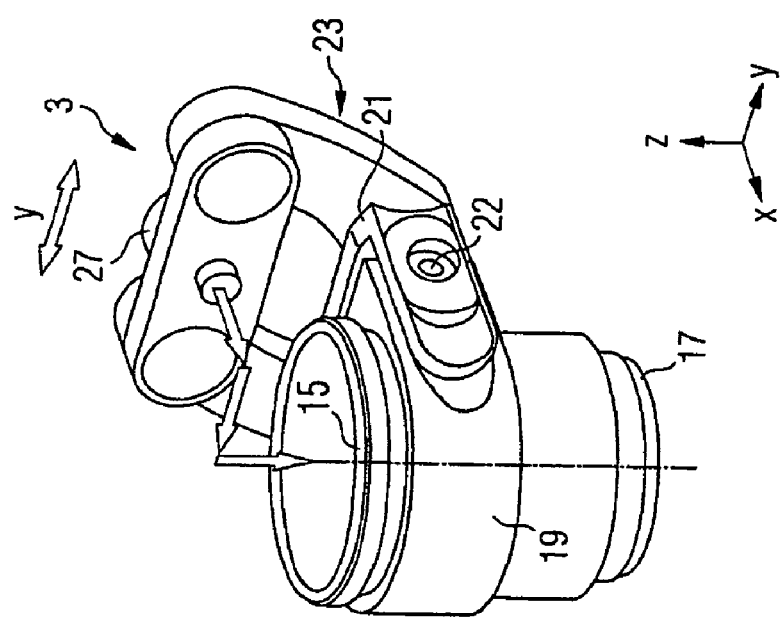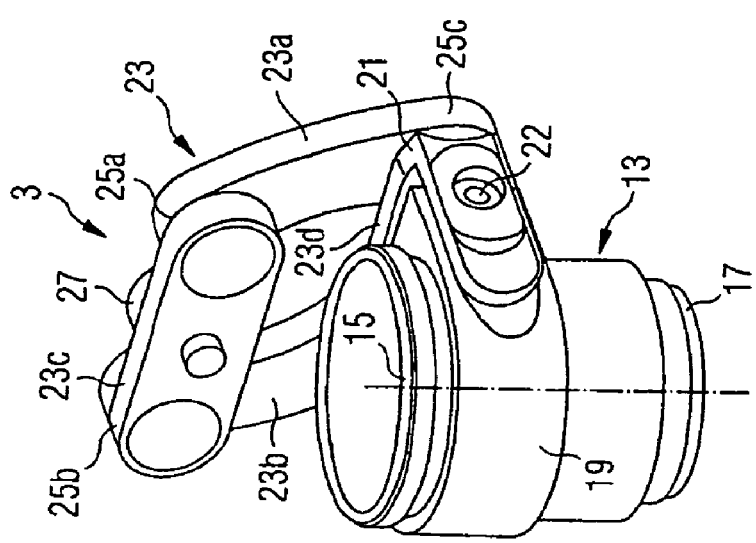

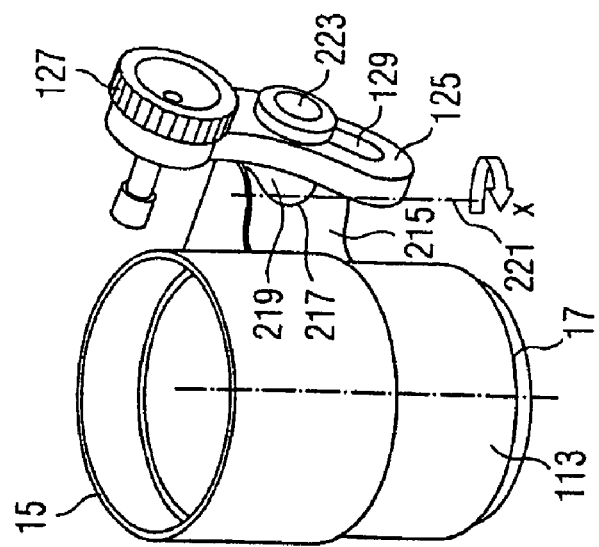
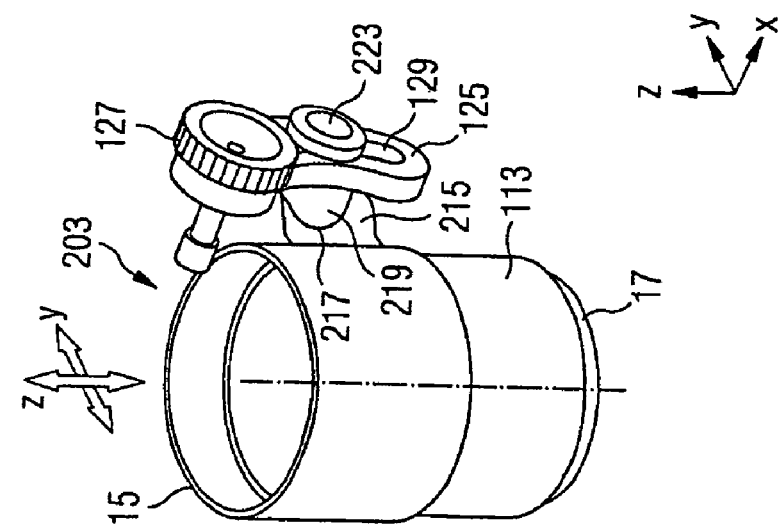
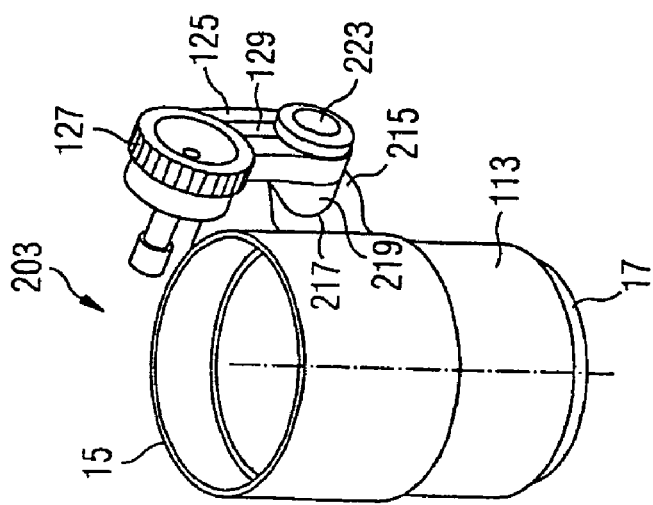

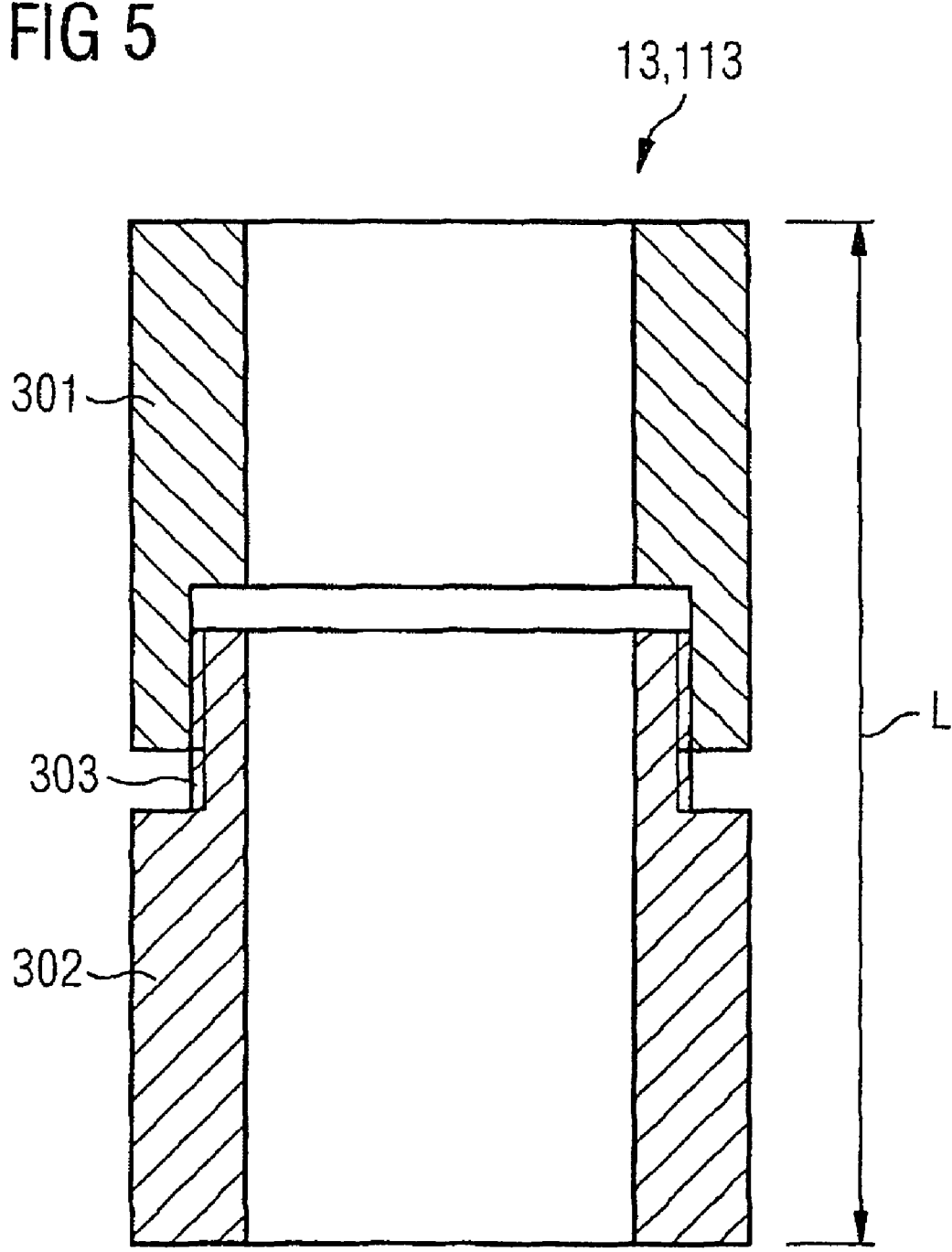

CAMERA ADAPTER HAVING A CAMERA HOLDER AND AN OPTICAL ADAPTER

BACKGROUND OF THE INVENTION

1. Field of the Invention

The invention relates to a camera adapter having a camera holder and an optical adapter as well as to the camera holder and the optical adapter themselves.

2. Description of the Related Art

Special phototubes that have a coupling-out device in the observer's binocular tube for photographic recordings are used in microscopy. However, it is not always readily possible to arrange the coupling-out device in the observer's binocular tube. For example, pivoting tubes often are used in microsurgery to adapt a surgical microscope ergonomically to the surgical situation. However, it is not possible to use a coupling-out device in the binocular tube in the case of pivoting tubes. Therefore, a compromise usually is selected at present for stereomicroscopes, for instance surgical microscopes, namely a so-called TV adapter which is provided with additional optics. This adapter is adapted to a coupling-out device in the region of the parallel beam path between the magnification changer and the binocular tube.

A TV adapter is highly suitable for recording television images, but is less suitable for use with a digital photographic apparatus. Therefore, the use of a TV adapter is a compromise that entails some disadvantages. For example, pupil adaptation is not optimal. As a result, in an image that has been recorded using the photographic apparatus, the field of view may be cut or such significant zooming may be required that only a small part of the object field can be recorded. On the other hand, the image quality criteria for high-resolution camera chips in digital photographic apparatuses with TV adapters generally are not met since they are adapted to the resolution of TV cameras, which is considerably lower than that of photographic apparatuses. In other words, the optics of TV adapters will scarcely meet the demands imposed by a digital photographic apparatus.

Another problem of prior art camera adapters used for surgical microscopes resides in the mechanical interface, and specifically in the manner in which the photographic apparatus is fixed to the camera adapter. This problem relates both to conventional camera adapters and to TV adapters. The mechanical interfaces currently used by many camera adapter manufacturers are a filter thread or a bayonet on the outer end of the camera objective. However, such mechanical interfaces are generally not standardized and often are changed with the yearly model change by the manufacturer. Under certain circumstances, such an interface may even be dispensed with entirely in the photographic apparatus. There are many products that do not have a filter thread or a bayonet, particularly in the field of compact digital cameras. Nevertheless, many camera adapter manufacturers accept the risks that have been mentioned and arise when models are changed and equip their camera adapters with mating pieces that match special bayonets or special filter threads and to which cameras having corresponding filter threads or bayonets can be fixed. However, the choice of cameras that can be fixed to such a camera adapter is limited due to the many different filter threads and bayonets that may result, for example, solely from different objective diameters.

It was proposed, therefore, to use holders for fastening photographic apparatuses to microscopes or telescopes. The holders use the stand thread present on virtually all photographic apparatuses and has undergone substantial standardization to fix the photographic apparatus. Stand threads are durable, that is to say the interface is generally retained as a constant variable when models are changed, and are offered by virtually all camera manufacturers on the underside of the camera. Filter threads or bayonets are arranged centrically with respect to the objective. However, the stand threads have a translatory offset with respect to the objective in at least two directions. Therefore, complicated alignment of a photographic apparatus, which is fixed directly or indirectly to an optical observation device by means of the stand thread, with respect to the photoadapter is necessary.

Apparatuses for fixing photographic apparatuses to microscopes, binoculars and telescopes using the stand thread are described, for example, in JP 2006-39191A, JP 2002-277953A, GB 1 215 710, US 2002/0197075 A1 and U.S. Pat. No. 2,990,759. All of these apparatuses have adjusting devices that can be used to compensate for an offset between the objective and the stand thread.

Therefore, a first object of the invention is to provide a holder for camera adapters that can be used advantageously to fix photographic apparatuses to a camera adapter or, if necessary, to an optical observation device using the stand thread.

A second object of the invention is to provide an optical adapter that can be used in camera adapters and avoids the disadvantages mentioned with respect to the TV adapters.

A third object of the invention is to provide an advantageous camera adapter.

SUMMARY OF THE INVENTION

An inventive camera holder for fixing a camera or a camcorder to an optical observation device comprises a pin having a stand thread for being screwed into a stand thread of a camera. The camera holder also comprises an adjusting device that is configured to make it possible to compensate for an offset between the stand thread and the camera objective of a camera being held in the camera holder. Furthermore, the camera holder comprises a variable-length sleeve designed to receive the camera objective. The inside of the sleeve may have play with respect to an inserted camera objective. The sleeve has a support for the camera housing at one end and a mechanical interface at the other end. The interface can be used to secure the sleeve relative to the optical observation device or another optical element, such as the optical adapter. The support is on a plane that runs perpendicular to the longitudinal axis of the sleeve, and hence a plane with surface features that are parallel to the longitudinal axis. The sleeve also has a mechanism for changing its axial length. The adjusting device is fixed directly or indirectly to the sleeve in a manner to make it possible to position the camera with respect to the sleeve.

The camera holder makes it possible to position and fix a photographic camera, for instance a digital photographic camera, relative to the sleeve in a manner that compensates for the offset between the stand thread and the objective. The sleeve can be secured relative to the optical observation device or to an interposed optical element using its mechanical interface. Thus, the inventive holder makes it possible to secure the photographic apparatus to the optical observation device or to the interposed optical element while compensating for the offset between the stand thread and the camera objective.

The optical axis of the camera objective is aligned relative to the optical axis of the optical observation device or of the interposed optical element by placing the camera housing onto the support of the sleeve in such a manner that the camera objective projects into the sleeve. The optical axis of the camera objective is oriented parallel to the longitudinal axis of the sleeve by placing the camera housing onto the support of the sleeve. In this case, use is made of the fact that that surface of the camera housing that surrounds the objective generally intersects the optical axis of the objective in a perpendicular manner. The sleeve is oriented with respect to the optical axis of the optical observation device or of the optical element using the mechanical interface of the sleeve that is used to secure the latter to the optical observation device. In this way, the optical axes of the optical observation device or of a further optical element, on the one hand, and of the camera objective, on the other hand, are parallel.

To align the camera, that is to say the camera objective, in a fully optical manner, it is also necessary for the exit pupil of the optical observation device or of the further optical element to be in the entrance pupil of the camera objective. The alignment can be effected by axially displacing the camera objective relative to the optical observation device or the further optical element along the optical axis of the camera objective. This displacement is effected in the inventive camera holder by changing the axial length of the sleeve.

The mechanism for changing the axial length of the sleeve may comprise, for example, a telescopic extension. The length of the sleeve can then be changed by simply pulling out the extension. A locking device may be provided to secure the extension in a position.

Alternatively, the mechanism may comprise a first sleeve part with an internal thread, and a second sleeve part with an external thread that is engageable with the internal thread of the first sleeve part. It is then possible to change the length of the sleeve by rotating the sleeve parts with respect to one another. Setting the length of the sleeve by means of rotation makes it possible to adjust the length of the sleeve in a very fine and accurate manner.

The sleeve may further comprise a rotating apparatus that is arranged and configured in a manner that it makes it possible to rotate at least a part of the sleeve that faces the camera being held about its longitudinal axis without the axial length of the sleeve being changed in the process. Rotating the rotating apparatus then makes it possible to straighten up the image from the photographic camera. The rotating apparatus may be integrated in the mechanical interface. In this case, the entire sleeve is rotated.

To compensate for the offset between the camera objective and the stand thread, the adjusting device preferably provides three degrees of freedom and at least one clamping means which can be used to fix the position of the camera with respect to the sleeve. Each clamping means acts on at least one degree of freedom. However, the adjusting device may also comprise a clamping means that acts on at least two degrees of freedom. This makes it possible to reduce the number of clamping means. It is particularly advantageous if the adjusting device comprises only a single clamping means that acts on all degrees of freedom since only a single clamping means must then be operated to fix the position of the camera. In particular, fixing using only a single clamping means is advantageous if the camera is intended to be fixed quickly. A tensioning apparatus, for instance a tensioning screw or a quick-action tensioner, may be provided as the clamping means.

The adjusting device may comprise at least one lever arm that can be rotated about an axis and/or at least one displacement mechanism, for example a slide to make it possible to move the adjusting device. Instead of being formed by a slide, the displacement mechanism may also be formed by an elongated hole in a lever arm together with a bolt that is passed through the elongated hole, for example the threaded bolt of a tensioning screw.

An inventive optical adapter that is intended to be interposed between an optical observation device and a camera comprises an afocal optical arrangement having at least two lenses and a real image of the entrance pupil as the exit pupil. The exit pupil of the optical arrangement is situated 40 millimeters to 100 millimeters behind the vertex of the last lens. This makes it possible to ensure that the exit pupil of the adapter can be imaged into the entrance pupil of a compact camera objective, for instance a digital camera.

If the exit pupil of the optical arrangement is situated 50 millimeters to 60 millimeters behind the vertex of the last lens, it is also possible to ensure, with a telefocal length of the compact camera objective, that the exit pupil of the adapter can be imaged into the entrance pupil of the camera objective.

The pupil position can be adjusted finely for most compact digital cameras by varying the distance between the camera objective and the optical adapter for optimal adaptation. Such a variation is possible, in particular, when the inventive camera holder with the variable-length sleeve is used to fix the camera to the optical adapter.

The inventive position of the exit pupil of the optical arrangement can be achieved, in particular, if the optical arrangement comprises a first lens combination that is configured in the manner of a telephoto objective, and a second lens combination that is connected downstream of the first lens combination and is configured in the manner of an eyepiece. In such an optical arrangement, the first lens combination generates an intermediate image that is imaged into infinity using the second lens combination. The configuration of the first lens combination in the form of a telephoto objective enables a relatively compact design of the optical adapter for a predefined focal length of the first lens system, or greater focal lengths can be used for a predefined overall length of the optical adapter, which helps to minimize imaging errors.

In this case, a suitable refractive power distribution in the optical arrangement also can be used to achieve the above-mentioned distance between the exit pupil and the vertex of the last lens without a field lens in the vicinity of the intermediate image. The refractive power distribution can be achieved, in particular, if the first lens combination comprises two lenses, one lens being a positive lens and the other lens being a negative lens that is downstream of the positive lens in the beam path and has a greater refractive power than the positive lens.

A reflecting surface, such as a prism surface or a mirror surface, may also be provided between the first lens combination and the second lens combination to deflect the beam path in the optical adapter.

An inventive camera adapter comprises both an inventive camera holder and an inventive optical adapter which is arranged between the camera holder and the optical observation device. It may also comprise a rotating apparatus which can be used to rotate the camera holder about the optical axis with respect to the optical adapter in order to straighten up the image.

Further features, characteristics and advantages of the invention emerge from the following description of exemplary embodiments with reference to the accompanying figures.

BRIEF DESCRIPTION OF THE DRAWINGS

FIGS. 2a to 2C show a first exemplary embodiment of the camera holder of the camera adapter from FIG. 1.

FIGS. 4a to 4c show a third exemplary embodiment of the camera holder of the camera adapter from FIG. 1.

FIG. 5 shows a detail of the camera holder.

DETAILED DESCRIPTION OF THE PREFERRED EMBODIMENTS

Figure 1:
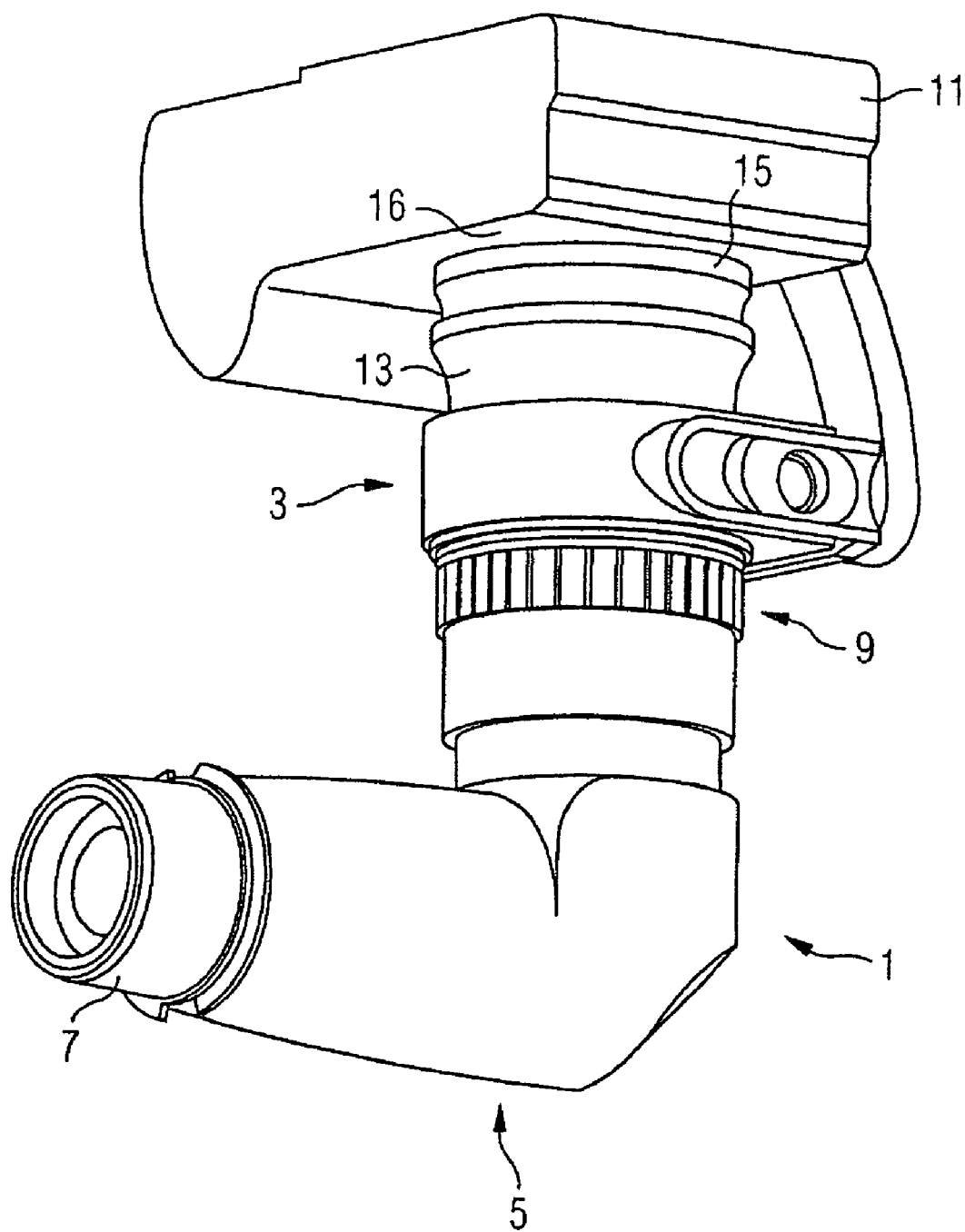
FIG. 1 shows an inventive camera adapter with a digital camera adapted to the latter.

A camera adapter in accordance with the invention is identified by the numeral 1 in FIG. 1. The camera adapter 1 comprises a camera holder 3 and an optical adapter 5. The optical adapter 5 has a plug-in sleeve 7 at one end. The sleeve 7 can be inserted into a matching connector of an optical observation device, such as a surgical microscope or a telescope. A mechanical interface 9 to which the camera holder 3 can be fastened is provided at the end of the optical adapter 5 opposite the sleeve 7. In the simplest case, the mechanical interface 9 may be a union nut that interacts with a matching external thread of the camera holder 3. However, the mechanical interface may be designed differently, and may be a connector and a plug-in sleeve that matches the connector. If appropriate, a union nut 9 may be in the optical adapter 5, and can be rotated about the optical axis of the optical adapter 5 with respect to other sections of the optical adapter 5. The union nut or other mechanical interface may also be part of the camera holder 3.

FIG. 1 also illustrates a digital camera 11 that is fastened to the camera holder 3 by means of its stand thread. The objective (not shown in FIG. 1) is inserted into a sleeve 13 of the camera holder 3. The edge 15 of the sleeve 13 forms a supporting surface for the housing surface 16 that surrounds the camera objective and perpendicularly intersects the optical axis of the objective. Support on the edge 15 therefore ensures that the optical axis of the camera objective is parallel to the longitudinal axis of the sleeve and thus parallel to the optical axis of the camera adapter 1. The sleeve 13 also shields the camera objective from ambient light.

FIGS. 2A to 2C illustrate a first embodiment of the camera holder of the camera adapter 1 in detail, and shows the sleeve 13, the edge 15 and an external thread 17 at the end opposite the edge 15. The external thread 17 defines the mating piece for the union nut of the optical adapter and thus forms the mechanical interface to the optical adapter. A plug-in sleeve or a connector may be provided instead of the external thread.

The sleeve 13 is surrounded by a clamping ring 19 that is connected to a slide 21. A parallelogram linkage 23 is arranged at that end of the slide 21 that faces away from the clamping ring 19. The linkage 23 includes four lever arms 23a to 23d that are each connected to one another at their ends by rotating joints 25a to 25d. In this case, the lever arm 23d is a crossmember of the slide 21. A screw 27 having a thread that matches the stand thread of a camera is arranged in the center of the lever arm 23c.

The illustrated construction illustrated in FIGS. 2A-2C makes it possible to align the camera 11 relative to the sleeve 13 with three degrees of freedom that are perpendicular to one another. Alignment in the X direction is effected using the slide 21, alignment in the Y direction is effected by moving the parallelogram 23 and alignment in the Z direction is effected by displacing the sleeve 13 in the clamping ring. Movement of the parallelogram, and thus movement of the screw 27 arranged in the parallelogram and the camera fastened to the screw 27 is not a linear movement, but rather is a movement on a bowed curve. However, the Z component of the curve can be compensated for by the displaceability of the sleeve in the clamping ring 19. Overall, this makes it possible to compensate for the offset between the camera objective and a stand thread in the camera housing.

The possible movements enabled by the slide 21, the parallelogram 23 and the displaceable sleeve 13 are indicated in FIGS. 2A to 2C by different setting states of the individual elements.

The slide 21 and the parallelogram linkage 23 are provided with clamping screws 22 that can be used to fix these elements against undesirable movement as soon as the camera has been aligned. So-called quick-action tensioning apparatuses may also be provided instead of clamping screws. A quick-action tensioner could comprise, for example, a movably mounted cam arranged to assume a first position or a second position. In the first position, the cam acts on two elements of the holder that can move relative to one another, and presses the two elements against one another for fixing the two elements relative to one another by means of frictional locking. In contrast, the movable elements are not pressed against one another in the second position of the cam. To implement the movement from the first position into the second position and vice versa, the cam may be mounted rotatably, for example, and may be connected permanently to an operating lever. The operating lever then can be used to change the position of the cam. A quick-action tensioning apparatus can of course also be used to tension the clamping ring 19.

Figure 3A:
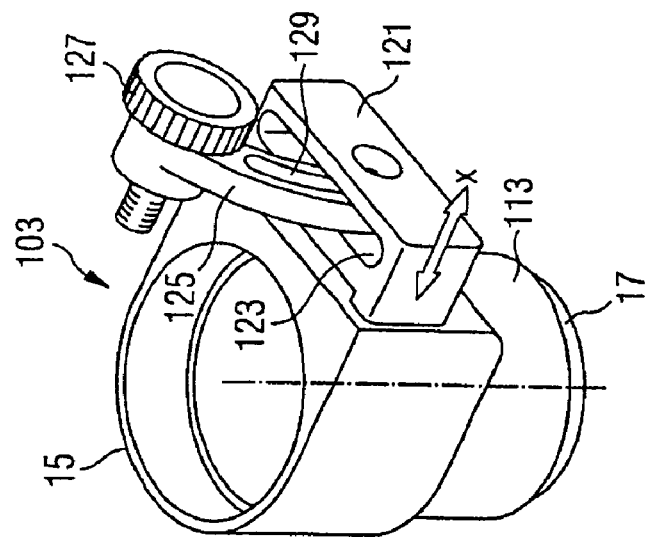
FIGS. 3A to 3C show a second exemplary embodiment of the camera holder of the camera adapter from FIG. 1.
Figure 3B:
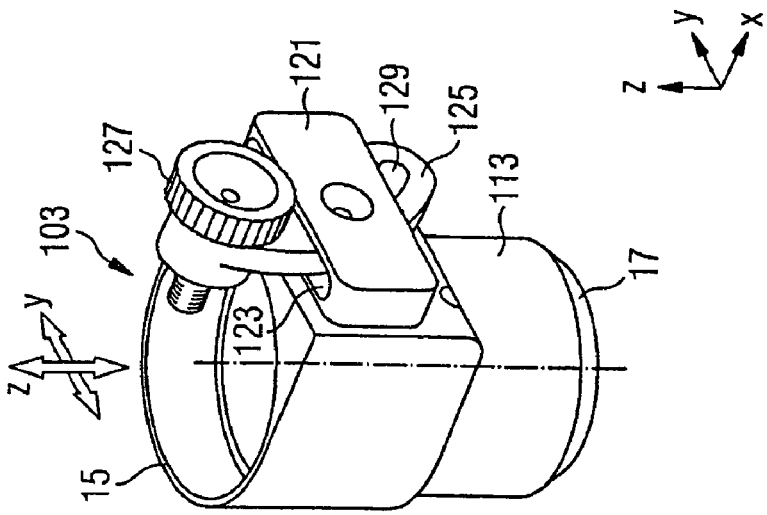
Figure 3C:
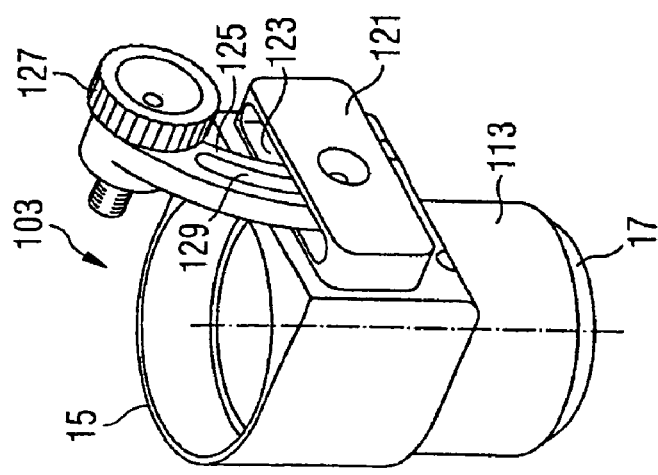

A camera holder in accordance with a second embodiment of the invention is identified by the numeral 103 in FIGS. 3A to 3C. The camera holder 103 comprises a sleeve 113 and a slide 121 fastened to the sleeve 113. The slide 121 has a receptacle 123 for receiving a bracket 125 that is in the form of a segment of a circle. A screw 127 that matches a stand thread of a camera is situated at the outer end of the bracket 125. The bracket 125 has an elongated hole 129 with a curvature that follows the curvature of the bracket 125.

A threaded pin (not shown) is passed through the elongated hole 129 of the bracket 125 and through the receptacle 122 of the slide 121. The threaded pin and the contour of the elongated hole 129 define a guide system for guiding the bracket 125 through displacement inside the receptacle 123 of the slide 121. The pin axis also constitutes an axis of rotation about which the bracket 125 can be rotated. The bracket 125 can be fixed with respect to the threaded pin using a tensioning nut on a section of the threaded pin (not shown) that projects from the slide 121.

Rotation of the bracket 125 about the threaded pin causes the screw 127 and a camera fastened to the screw 127 to describe an arc with a radius defined by the distance between the screw 127 and the threaded pin. However, this distance can be changed by displacing the bracket inside the receptacle so that the position of the screw 127 is displaced in the region of an annular surface with boundaries defined by the minimum circle radius and the maximum circle radius. The minimum and maximum circle radii are defined, in turn, by the length of the bracket 125 and the position of the elongated hole 129 in the bracket 125. A straight bracket with a straight elongated hole can also be used instead of a curved bracket and a curved elongated hole.

Rotational movement of the bracket 125 about the threaded pin and displacement of the elongated hole 129 relative to the threaded pin can be carried out to align the camera in the Y and Z directions, as shown in FIGS. 3A and 3B. On the other hand, the slide 121 can be displaced in the X direction to align the camera in the X direction, as shown in FIG. 3C. The slide 121 has a clamping screw to secure the slide 121 in a selected position. As a result, three degrees of freedom are available for aligning the camera and make it possible to compensate for the offset between the stand thread and the camera objective. Different positions of the slide 121 and of the bracket 125 are illustrated in FIGS. 3A to 3C to illustrate the possible movements.

A third embodiment of the camera holder is described below with reference to FIGS. 4A to 4C. This embodiment is very similar to the embodiment of FIGS. 3A to 3C. Elements in both embodiments are denoted by the same reference numerals in FIGS. 3A to 3C and 4A to 4C.

The camera holder 203 of the third embodiment comprises a sleeve 113 with an attachment 215 that has a receptacle 217. A pin 219 is pivotably mounted in the receptacle 217. The pivot axis of the pin 219 is parallel to the central axis of the sleeve 113. The pin 219 extends through an elongated hole 129 of a curved bracket 125. As in the second exemplary embodiment, the elongated hole 129 has a curvature that follows the curvature of the bracket 125. In this case too, a straight bracket with a straight elongated hole can be used instead of a curved bracket with a curved elongated hole.

As in the second embodiment, the screw 127 and a camera fastened to the screw 127 can be moved in the region of an annular surface in the third embodiment as well. Thus, a setting operation in the Y and Z directions can be carried out by a combination of rotating the bracket 125 about the pin 219 and displacing the bracket relative to the pin 219.

Alignment in the X direction is carried out in the third embodiment by pivoting the pin 219 about the pivot axis 221, as shown in FIG. 4C. The pivot axis 221 is parallel to the central axis of the sleeve 113, and the distance between the screw 127 and the central axis of the sleeve 113 changes as the pin 219 is pivoted about the pivot axis 221. Therefore, three degrees of freedom for aligning the camera relative to the sleeve 113 can be implemented by an interaction of rotating the bracket 125 about the pin 219, pivoting the pin 219 about the pivot axis 221 and displacing the bracket 125 relative to the pin 219. The position can be fixed by a single clamping means 223 in the region of the pin 219, such as a tensioning screw placed on the pin 219.

In all three exemplary embodiments, the sleeve 13, 113 is of two-part design. This is illustrated diagrammatically in FIG. 5. The sleeve 13, 113 illustrated in FIG. 5 comprises a first sleeve part 301 with an internal thread, and a second sleeve part 302 with an external thread 303 that matches the internal thread. The two sleeve parts 301, 302 are partially screwed to one other.

The axial length L of the sleeve can be varied by rotating the two sleeve parts 301, 302 relative to one another. The change in length L based on the angle of rotation depends on the pitch of the thread 303. Rotating the two sleeve parts 301, 302 relative to one another enables the distance between the optical adapter 5 and the camera objective of a camera 11 held in the camera holder 3 to be set precisely, and can be used to align the exit pupil of the optical adapter 5 into the entrance pupil of the camera objective. It is also possible to configure the sleeve in the manner of a telescopic extension instead of the above-described alignment using an external thread and an internal thread of the two sleeve parts 301, 302. The alignment then can be effected by adjusting the telescopic extension. In particular, the telescopic extension also makes it possible to configure the two sleeve parts to be rotated about the sleeve axis without changing the length of the sleeve L during rotation. Such rotation of sleeve parts relative to one another can be used to straighten up the image offered by the optical observation device in the camera. In this case, the possible rotation described with reference to FIG. 1 can be dispensed with in the optical adapter 5.

Figure 6:
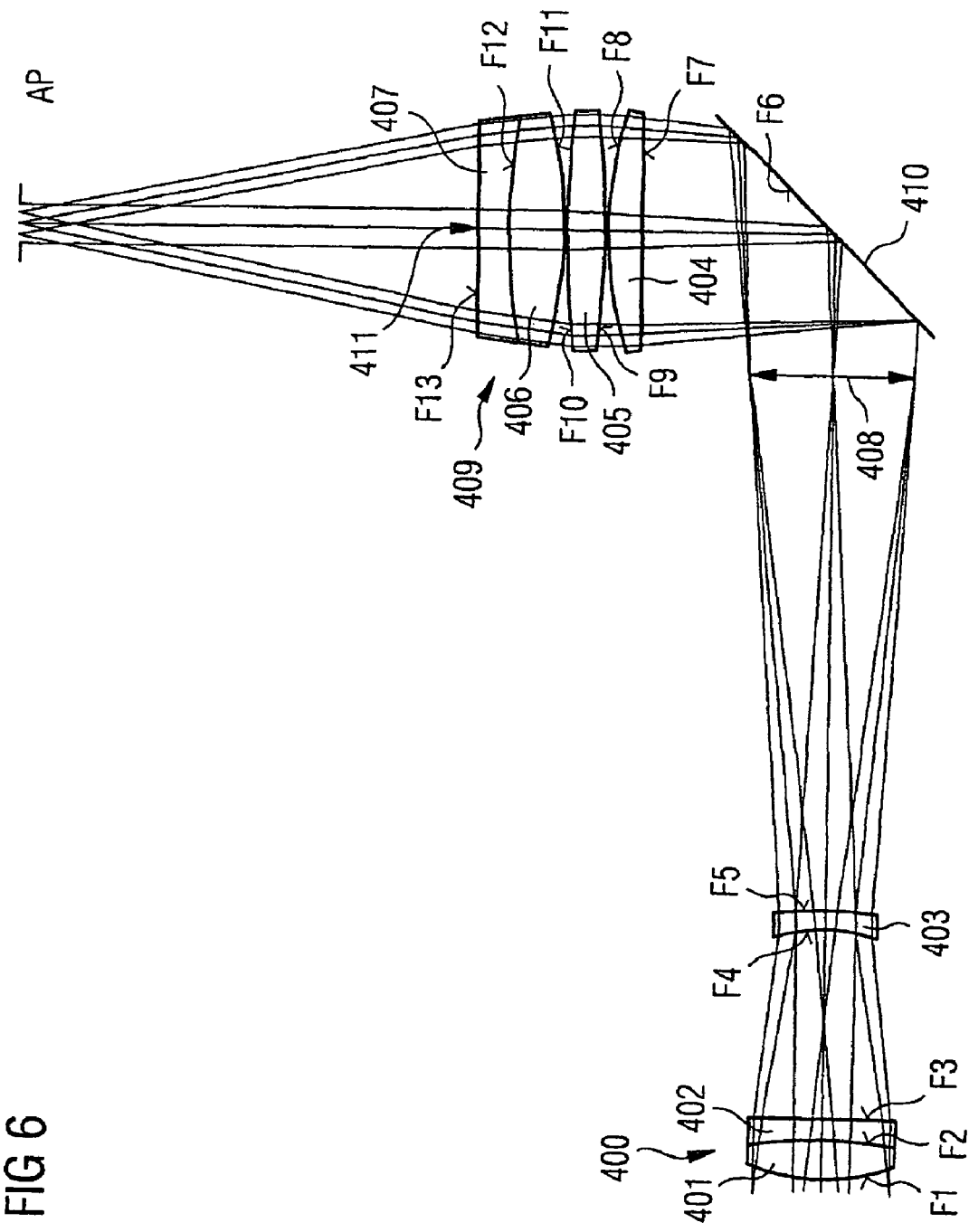
FIG. 6 diagrammatically shows the optical components of the optical adapter.

FIG. 6 diagrammatically illustrates the optical components of the optical adapter. The optical adapter 5 comprises five lenses 400, 403, 404, 405 and 409, the first lens 400 and the last lens 409 of which are in the form of cemented components.

The lenses can be subdivided into two lens groups. The first lens group comprises the lenses 401, 402 and 403 and constitutes a telephoto objective. The cemented component 400 constitutes overall a positive lens comprised of a positive lens 401 and a negative lens 402. The lens 403 is a negative meniscus lens with a refractive power greater than the refractive power of the cemented component.

The second lens combination comprises three positive lenses 404, 405 and 409 and constitutes an eyepiece system used to image the intermediate image 408 from the telephoto objective into infinity. The last positive lens 409 is a cemented component comprised of a positive lens 406 and a negative lens 407. The term eyepiece system is used here because the imaging properties of the second lens group correspond to those of an eyepiece. However, in contrast to an eyepiece, the second lens system is not intended to be used to view the intermediate image 408 with the eye.

A reflecting surface 410 also is arranged between the telephoto objective and the eyepiece system for deflecting the beam path, and may be a mirror-coated pane of glass or a prism surface.

The radii, thicknesses, types of glass and free lens diameters of the lens surfaces F1 to F13 are compiled in the following table.

TABLE

| No. | Radius | Thickness | Glass | $\emptyset_{free}$ |
|---|---|---|---|---|
| F1 | 21.5160 | ... | | 17.0 |
| | | 5.000 | NPK52A | |
| F2 | −57.5310 | ... | | 17.0 |
| | | 3.000 | NBAF51 | |
| F3 | 291.352 | ... | | 17.0 |
| | | 24.45 | | |
| F4 | −14.2270 | ... | | 12.0 |
| | | 2.500 | NSK5 | |
| F5 | −47.9850 | ... | | 12.0 |
| | | 88.00 | | |
| F6 | FLAT | Mirror | | |
| | | 23.21 | | |
| F7 | −277.810 | ... | | 30.5 |
| | | 4.000 | NFK5 | |
| F8 | −50.1190 | ... | | 31.0 |
| | | 0.300 | | |
| F9 | 163.190 | ... | | 31.0 |
| | | 4.500 | NFK5 | |
| F10 | −110.600 | ... | | 31.0 |
| | | 0.300 | | |
| F11 | 66.8340 | ... | | 30.0 |
| | | 6.500 | NLKA9 | |
| F12 | −66.8340 | ... | | 29.0 |
| | | 4.000 | NSF66 | |
| F13 | FLAT | ... | | 27.0 |
| | | 55.00 | | |
| | | ... | | 4.4ØEP |

The refractive power distribution over the two lenses of the telephoto objective is selected so that it is possible to dispense with a field lens in the vicinity of the intermediate image 408. Thus, the exit pupil AP can be a real image of the entrance pupil of the optical system that is at a distance of between 40 millimeters and 100 millimeters, preferably between 50 millimeters and 60 millimeters, from the vertex 411 of the lens surface F13. If the lenses are designed in accordance with the data specified in the table, the exit pupil AP is 55 millimeters behind the vertex 411. Thus, the exit pupil AP of the optical adapter 5 can be imaged into the entrance pupil of the camera objective even with a telefocal length of the camera objective. The pupil position can be adjusted finely by finely adjusting the length of the sleeve 13, 113 in the camera holder.

The imaging scale of the optical adapter 5 is selected to be 3.7 to 1 in the present embodiment. Such an imaging scale is obtained if the ratio of the focal length of the first lens system to the focal length of the second lens system is 3.7 to 1. In afocal systems like the optical adapter, this numerical ratio also corresponds to the ratio of the entrance pupil diameter to the exit pupil diameter. In the case of an entrance pupil with a diameter of 16 millimeters, the selected imaging scale of 3.7 to 1 generates an exit pupil AP of approximately 4.3 millimeters. If this exit pupil diameter is used as a basis and a pupil distance from the vertex of the last lens of 55 millimeters is assumed, an image which fills the image format can be achieved with a focal length of f=100 of the camera objective, which focal length has been standardized to the miniature format. The focal length of f=100 corresponds to a focal length of f=20.6 millimeters in the case of a digital camera with a 1/1.8" sensor.

An optical adapter whose lenses have the parameters specified in the table makes it possible to make full use of the camera chip of a digital camera having an objective operating in the telephoto range. Restriction to the full-format focal length of f=100 (standardized to the miniature format) is a compromise between the optical complexity and the costs. If the wish were to achieve a full-format image in the wide angle range, very large lens diameters would be required in the optical system with an exit pupil position of 55 millimeters behind the vertex of the last lens to be able to achieve the larger image angles present in the wide angle range. However, a very high level of optical complexity with an increased number of lenses, then is required to satisfy the required image quality criteria, which in turn increases the overall size, weight and production costs of the optical adapters.

In the case of a surgical microscope, the beam path for the optical adapter can be coupled out in the parallel beam path between the magnification system of the surgical microscope and the binocular tube using a splitter prism.

Although the camera holder, the optical adapter and the camera adapter have been described with reference to a photographic camera, they are also suitable for use together with camcorders.

What is claimed is:

1. A camera holder (3, 103, 203) for fixing a camera (11) or a camcorder to an optical observation device, the camera (11) having a housing (16) with a stand mating thread and having an objective offset from the stand mating thread, said camera holder (3, 103, 203) comprising:
    a sleeve (13, 113) having first and second ends spaced apart along a longitudinal axis, the first end being configured to receive the camera objective and defining a support (15) for supporting the housing (16) of the camera (11), said support (15) defining a plane aligned substantially perpendicular to the longitudinal axis of the sleeve (13, 113), the second end defining a mechanical interface (9) for securing the sleeve to the optical observation device, the sleeve (13, 113) having a mechanism (301, 302, 303) for changing an axial length (L) defined between the first and second ends; and
    an adjusting device (19, 23, 121, 125) directly or indirectly fixed to the sleeve (13, 113) and having a pin (27) with has a stand thread for being screwed into the stand mating thread of the camera (11), the adjusting device (19, 23, 21, 121, 125) being adjustable to compensate for the offset between the stand mating thread and the objective of the camera (11) for positioning the camera (11) with respect to the sleeve.

2. The camera holder (3, 103, 203) of claim 1, wherein the mechanism for changing the length of the sleeve (13, 113) comprises a telescopic extension.

3. The camera holder (3, 103, 203) of claim 1, wherein the mechanism for changing the length of the sleeve (13, 113) comprises a first sleeve part (301) with an internal thread, and a second sleeve part (302) with an external thread (303) engaged with the internal thread of the first sleeve part (301).

4. The camera holder (3, 103, 203) of claim 1, wherein the sleeve (13, 113) comprises a rotating apparatus arranged and configured for rotating at least part of the sleeve (13, 113) facing the camera (11) about the longitudinal axis of the sleeve (13, 113).

5. The camera holder (3, 103, 203) of claim 4, wherein the rotating apparatus is integrated in the mechanical interface (9).

6. The camera holder (3, 103, 203) of claim 1, wherein the adjusting device (19, 21, 23, 121, 125) provides three degrees of freedom, and at least one clamping means for fixing the position of the camera (11) with respect to the sleeve (13, 113), the clamping means acting on at least one of the degrees of freedom.

7. The camera holder (103, 203) of claim 6, wherein the clamping means which acts on at least two degrees of freedom.

8. The camera holder (203) of claim 7, wherein the adjusting device comprises only one clamping means that acts on all three degrees of freedom.

9. The camera holder (3, 103, 203) of claim 6, the clamping means comprises a tensioning apparatus.

10. The camera holder (3, 103, 203) of claim 9, wherein the tensioning apparatus comprises a quick-action tensioner.

11. The camera holder (3, 103, 203) of claim 6, wherein the adjusting device comprises at least one lever arm (23A-23D, 125) that is rotatable about an axis of rotation and at least one displacement mechanism (19, 21, 121) for displacing the lever arm (23A-23D, 125).

12. The camera holder (3, 103, 203) of claim 11, wherein the displacement mechanism (21, 121) is a slide.

13. The camera holder (3, 103, 203) of claim 11, wherein the at least one displacement mechanism comprises an elongated hole (129) in the lever arm (125) and a bolt (219) passed through the elongated hole (129).

* * * * *